United States Patent
Degel et al.

(10) Patent No.: US 8,157,884 B2
(45) Date of Patent: *Apr. 17, 2012

(54) METHOD FOR THE CONTINUOUS OR DISCONTINUOUS EXTRACTION OF A METAL OR SEVERAL METALS FROM A SLAG THAT CONTAINS THE METAL OR A COMPOUND OF THE METAL

(75) Inventors: Rolf Degel, Ratingen (DE); Jürgen Kunze, Xanten (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 141 days.

This patent is subject to a terminal disclaimer.

(21) Appl. No.: 12/309,796

(22) PCT Filed: Oct. 25, 2007

(86) PCT No.: PCT/EP2007/009249
§ 371 (c)(1),
(2), (4) Date: Jan. 30, 2009

(87) PCT Pub. No.: WO2008/052690
PCT Pub. Date: May 8, 2008

(65) Prior Publication Data
US 2009/0249919 A1 Oct. 8, 2009

(30) Foreign Application Priority Data
Nov. 2, 2006 (DE) .......... 10 2006 052 181

(51) Int. Cl.
*C22B 4/00* (2006.01)
*C22B 7/02* (2006.01)

(52) U.S. Cl. ............. 75/10.35; 75/10.39; 75/10.48; 75/10.51; 75/10.56; 75/10.67

(58) Field of Classification Search .......... 75/10.35, 75/10.48, 10.51, 10.56, 10.54, 10.39, 10.67, 75/10.59
See application file for complete search history.

(56) References Cited

U.S. PATENT DOCUMENTS
3,409,726 A * 11/1968 Arimicihi et al. .............. 373/85
4,036,636 A * 7/1977 Ammann et al. .............. 75/627
4,060,409 A 11/1977 Ammann et al.
(Continued)

FOREIGN PATENT DOCUMENTS
EP 0 487 031 5/1992
EP 0 487 032 5/1992
WO 01/49890 7/2001

*Primary Examiner* — George Wyszomierski
*Assistant Examiner* — Tima M McGuthry Banks
(74) *Attorney, Agent, or Firm* — Lucas & Mercanti, LLP; Klaus P. Stoffel

(57) ABSTRACT

The invention concerns a method for the continuous or discontinuous extraction of a metal or several metals from a slag that contains the metal or a compound of the metal, in which the liquefied metal-containing slag is heated in a primary or secondary smelting unit (1). To provide an improved method for extracting metals, especially copper, from slags, the invention provides that the metal-containing slag is heated in a primary or secondary smelting unit (1) designed as an alternating-current electric furnace, and the molten material is then fed from the primary or secondary smelting unit (1) into a furnace (2) designed as a direct-current electric furnace, in which the metal to be extracted is subjected to an electrolytic separation, where a reducing agent in the form of calcium silicide (CaSi), calcium carbide ($CaC_2$), ferrosilicon (FeO), aluminum (Al), and/or reducing gases is added and/or injected into the primary or secondary smelting unit (1).

11 Claims, 2 Drawing Sheets

U.S. PATENT DOCUMENTS

| | | |
|---|---|---|
| 4,110,107 A | 8/1978 | Paulson et al. |
| 4,940,486 A * | 7/1990 | Sommerville et al. ....... 75/10.19 |
| 5,765,489 A | 6/1998 | Hugentobler et al. |
| 6,436,169 B2 | 8/2002 | Hirai et al. |
| 2006/0065071 A1 * | 3/2006 | Fleischanderl et al. ...... 75/10.35 |
| 2006/0196308 A1 | 9/2006 | Rollinger et al. |

* cited by examiner

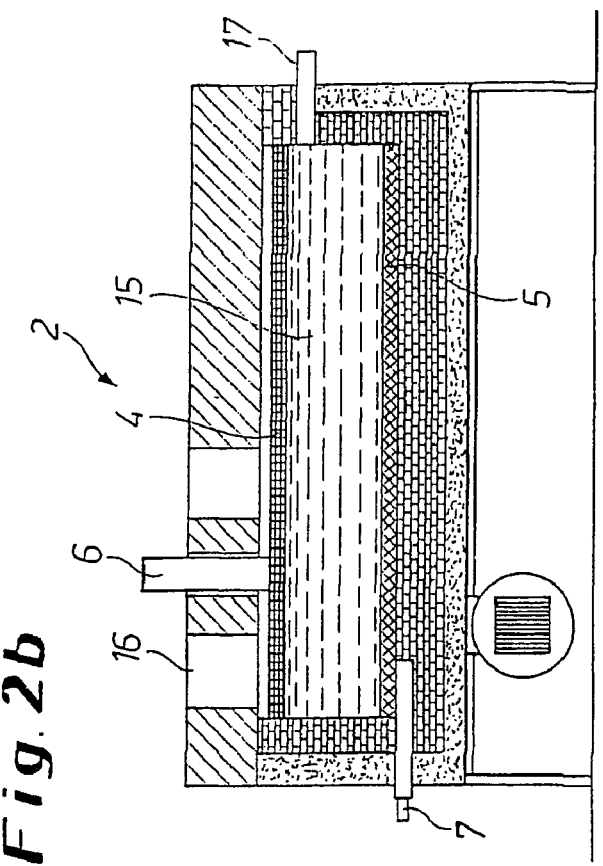
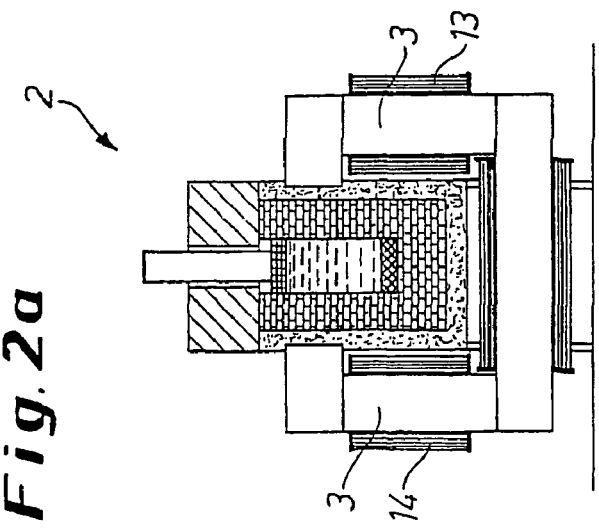

METHOD FOR THE CONTINUOUS OR DISCONTINUOUS EXTRACTION OF A METAL OR SEVERAL METALS FROM A SLAG THAT CONTAINS THE METAL OR A COMPOUND OF THE METAL

This application is a 371 of PCT/EP2007/009249 filed 10/25/2007.

The invention concerns a method for the continuous or discontinuous extraction of a metal or several metals from a slag that contains the metal or a compound of the metal, in which the liquefied metal-containing slag is heated in a primary or secondary smelting unit.

When copper concentrates are melted, copper matte and slag are formed. The slag contains copper both in dissolved form and in the form of mechanically converted matte inclusions. There are two basic methods for purifying the slag: slag flotation after quenching, crushing, and grinding, and pyrometallurical reduction of the liquid slag.

Pyrometallurgical slag reduction or smelting of concentrates is usually carried out in one of three variants, namely:

(1) in an AC arc furnace by reduction with coke and electrodes, slag preheating, and sedimentation, (2) in horizontal cylindrical rotary furnaces by injection of a reducing agent, e.g., in a Teniente slag purification furnace, (3) in vertical converters with injection of a reducing agent, e.g., TBRC or Isasmelt, Aussmelt, or similar methods.

Slag purification requires the reduction of magnetite in order to release the suspended inclusions and make their sedimentation possible and in order to allow the coreduction of cuprous oxide.

The most frequently used copper slag purification in AC arc furnaces requires a relatively large furnace due to the necessary reduction and sedimentation time of 3 to 8 hours. It causes a relatively high specific power consumption due to the strong specific effect of the heat losses. Slag purification in an arc furnace is carried out as a batch or semicontinuous process. The flexibility of the arc furnace with respect to temperature control allows accurate slag preheating. However, the formation of dispersed metallic copper inclusions as the product of the reduction of cuprous oxide along with a portion of small copper matte inclusions limit the phase separation and adequate copper recovery.

A method for the extraction of metals from metal-bearing slags, especially iron-copper slags, in a smelting furnace is known from U.S. Pat. No. 4,110,107. The molten slag is fed into an arc furnace, in the bottom of which a molten metal bath is maintained. A carbon injecting device is inserted for introducing carbon into the bottom of the molten metal bath. A flux, such as CaO, is also fed into the bath. After the reduction, the metal is tapped from the furnace.

A similar method for the extraction, especially of nickel and a nickel-copper mixture, from a molten slag is disclosed by U.S. Pat. No. 4,036,636. In this method, magnetite in the slag is reduced with carbon-containing materials. While the slag is being reduced, it is mixed with a mechanical stirrer.

WO 01/49890 A1 discloses a method for producing blister copper directly from copper sulfate concentrate, in which the copper is recovered from finely ground and cooled copper matte in a reaction vessel with oxygen enrichment. The oxygen enrichment is carried out by adding oxygen-enriched air with an oxygen concentration of at least 50%. Blister copper is unrefined copper with a blistered appearance. In its molten state, copper has a higher capacity for dissolving gases than the solid metal. When the copper solidifies, the gases separate out as small blisters.

U.S. Pat. No. 4,060,409 describes a pyrometallurgical system for maintaining a material in a molten state. The system comprises a vessel for molten material, whose interior is formed as a number of uniform cells. In addition, a mechanical stirrer is provided for each such cell to allow the molten material to be stirred.

U.S. Pat. No. 6,436,169 discloses a method for operating a copper smelting furnace, in which an iron-containing substance is added. This substance contains more than 80 wt. % iron and has a specific gravity of 3.0 to 8.0 and a particle diameter of 0.3 to 15 mm. The iron-containing substance is added to iron-containing copper slag. A reduction of $Fe_3O_4$ to FeO is then carried out.

EP 0 487 032 B1 describes an installation for the continuous smelting of copper. It comprises a smelting furnace for melting and oxidizing copper concentrate to produce a mixture of matte and slag and a separating furnace for separating the matte from the slag. In a converter, the matte that has been separated from the slag is oxidized to produce blister copper. The smelting furnace, the separating furnace and the converter are connected with one another by launders. Anode furnaces are provided for refining the blister copper produced in the converter. Crude copper launders create a connection between the converter and the anode furnaces.

EP 0 487 031 B1 describes a method for the continuous smelting of copper. Here, too, there is a smelting furnace, a separating furnace, and a converter, which are connected with one another by launders. In addition, anode furnaces are provided, which are connected with the converter by launders. The copper concentrate is fed into the smelting furnace, in which it is melted and oxidized to produce a mixture of first matte and slag. The mixture of first matte and slag is then fed to the separating furnace, in which the matte is separated from the slag. The separated matte is then fed into the converter, in which it is oxidized to produce blister copper. The blister copper then flows into one of the anode furnaces, in which the high-grade copper is produced.

The previously known methods for extracting a metal from a slag that contains the metal need to be improved where their efficiency is concerned.

Therefore, the objective of the invention is to provide an improved method for extracting metals, especially copper, from slags.

The solution to this problem by the invention is wherein the metal-containing slag is heated in a primary or secondary smelting unit designed as an alternating-current electric furnace, and the molten material is then fed from the primary or secondary smelting unit into a furnace designed as a direct-current electric furnace, in which the metal to be extracted is subjected to an electrolytic separation, where a reducing agent in the form of calcium silicide (CaSi), calcium carbide ($CaC_2$), ferrosilicon (FeO), aluminum (Al), and/or reducing gases is added and/or injected into the primary or secondary smelting unit.

An arc furnace is preferably used as the primary or secondary smelting unit.

The metal to be extracted is preferably copper (Cu) present in a copper-containing slag. However, the metal to be extracted could also be lead (Pb), zinc (Zn), platinum (Pt), chromium (Cr), or nickel (Ni).

In the primary or secondary smelting unit designed as an alternating-current electric furnace, it is possible to carry out a preliminary reduction or oxidation of the slag or of metal concentrates and a separation of matte or a metal alloy, especially copper matte, with intensive slag reduction and removal of inclusions being carried out in the second furnace, which is designed as a direct-current electric furnace.

In the second furnace, which is designed as a direct-current electric furnace, the molten bath can also be electromagnetically stirred during the recovery of the metal. To produce the electromagnetic stirring, at least one electromagnet can act on the molten bath present in the second furnace. However, it is also possible to use at least one permanent magnet to act on the molten metal in the second furnace to produce the electromagnetic stirring. The one or more magnets preferably induce a magnetic field of 50 to 1,000 gauss. The magnetic field covers at least part of the cross section of the molten bath and the region of the electrodes in the second furnace.

It is also possible to feed coke into the primary or secondary smelting unit during the heating as an additional reducing agent.

Carbon-containing material, especially coke, can be fed onto the surface of the molten material in the second furnace in such a way that a layer of the carbon-containing material of essentially constant thickness forms, and the layer, which acts as an anode, is in contact with an electrical connection. In addition, it can be provided that a layer of matte or metal alloy, especially copper matte, of essentially constant thickness is maintained in the bottom region below the molten bath in the second furnace, and the layer, which acts as a cathode, is in contact with an electrical connection.

The invention thus proposes a two-step slag reduction and removal of metal (preferably copper) in two arc furnaces, in which it is intended that the aforementioned specific reducing agents be used, since they allow especially good reduction. The first furnace, the AC electric arc furnace, serves the purpose of preliminary reduction of the slag and separation of the matte (copper matte) and is followed by intensive slag reduction and removal of the inclusions in a channel-type DC reduction furnace with electromagnetic stirring. The use of electromagnetic stirring, which improves mass transfer on the reduction surface and the coalescence of the inclusions, together with slag electrolysis and electrokinetic phenomena, allows efficient slag purification and a high level of recovery of metal, especially copper.

The drawings show a specific embodiment of the invention.

FIG. 2a is a sectional front view and FIG. 2b a sectional side view of the channel-type DC reduction furnace for intensive slag reduction and removal of inclusions with the use of a coke bed and liquid copper matte as electrodes.

Figure 1:
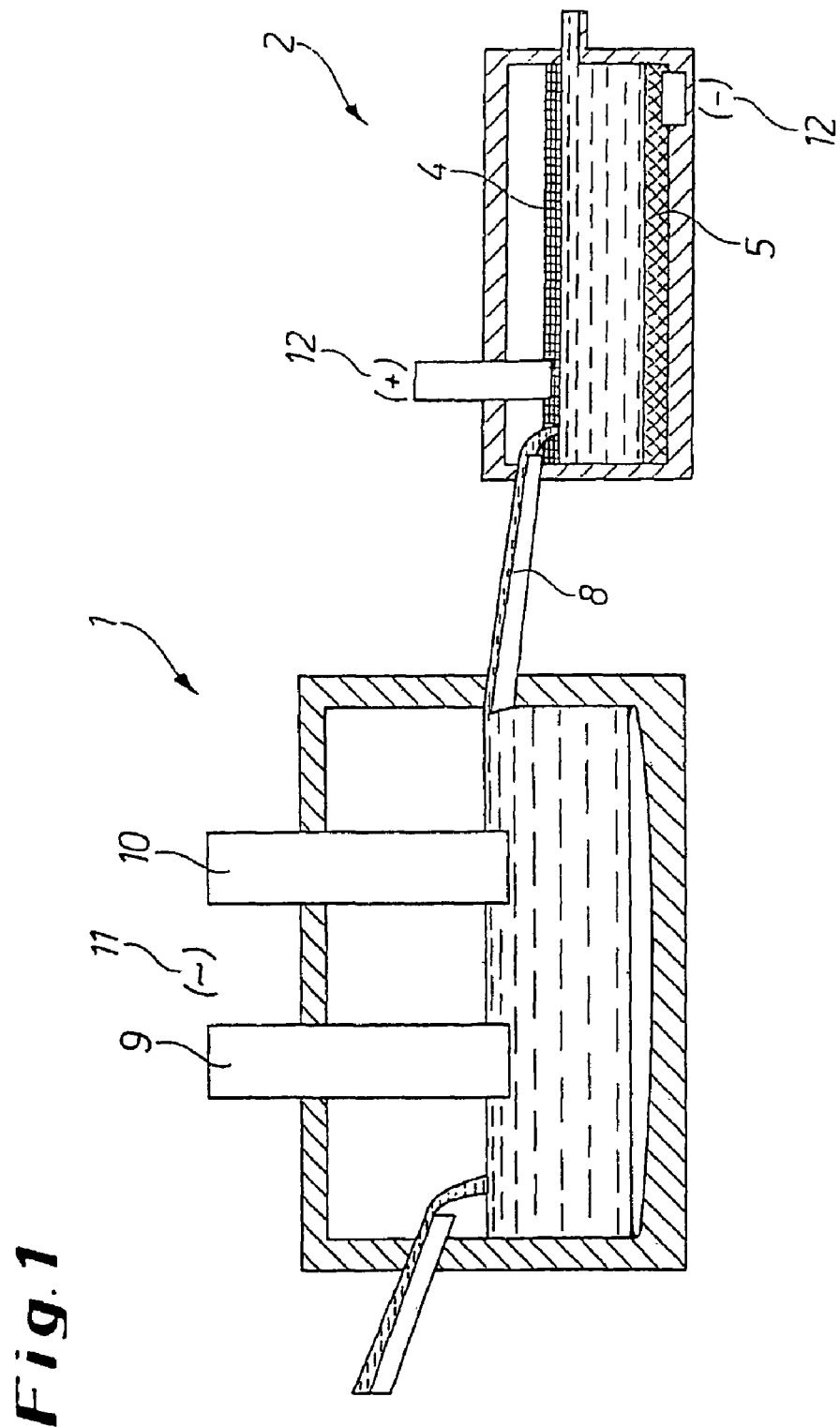
FIG. 1 is a schematic drawing of a primary or secondary smelting unit in the form of a three-phase arc furnace with a downstream channel-type DC reduction furnace.

FIG. 1 shows a primary or secondary smelting unit 1 in the form of an alternating-current furnace, which is followed by a second furnace 2 in the form of a direct-current furnace. The molten bath of copper slag produced in furnace 1 is fed into the second furnace 2 through a connecting channel 8 in the form of a launder (also possible in the form of a rectangular furnace).

In the first furnace 1, two graphite electrodes 9 and 10 are submerged in the molten slag contained in this furnace. The two electrodes 9, 10 are connected to an alternating-current source 11.

Depending on the type of primary and/or secondary smelting unit 1, the slags contain:
  metal droplets, for example, in ferroalloy processes (e.g., FeNi, FeMn, FeCr, FeNb, and $TiO_2$ production processes),
  metals in the form of sulfides or oxides, with IsaSmelt, Aussmelt, Outokumpu, or TBRC acting as primary smelters,
  metals and metal alloys that are formed as products during the processing of oxidic charge materials, e.g., from an electric furnace or shaft furnace.

The second furnace 2 has a slag inlet 16 for the slag 15 and a slag outlet 17. In the second furnace 2, there are two electrodes 4 and 5 in the form of plate-like layers of coke and matte, respectively. The two electrodes 4, 5 are connected to a direct-current source 12 by electrical connections in the form of graphite contact electrodes 6 and 7, respectively. The upper, horizontally oriented electrode 6 is connected to the positive terminal of the direct-current source 12 and serves as the anode. Similarly, the lower, likewise horizontally oriented electrode 5 is connected to the negative terminal of the direct-current source 12 and thus serves as the cathode. The copper is extracted by an electrolytic process.

As FIG. 2 shows, the second furnace 2 is constructed as a channel-type furnace. On the sides, electric coils 13 and 14 are wound around metal cores to form electromagnets 3. These magnets produce an electromagnetic stirring effect, which stirs the molten material in the second furnace 2 (see below).

The essential feature is that the metal-containing slag is heated in the alternating-current electric furnace 1, and the molten material is then fed from the furnace 1 into the furnace 2, which is designed as a direct-current electric furnace, in which the metal to be extracted, which may be present, e.g., in the form of its sulfide or oxide, is subjected to an electrolytic separation. In this process, a reducing agent is added or injected into furnace 1 in the form of calcium silicide (CaSi), calcium carbide ($CaC_2$), ferrosilicon (FeO), aluminum (Al), and/or reducing gases.

The reduction involves a process that is already well known in itself and proceeds as follows (for the example of the addition of coke): magnetite and cuprous oxide in the slag react here with the carbon of the graphite electrodes 9, and the added coke according to the equations:

$$Fe_3O_4 + CO = 3FeO + CO_2$$

$$Cu_2O + CO = 2Cu + CO_2$$

$$CO_2 + C = 2CO$$

The reduction of the cuprous oxide is limited by the magnetite coreduction. The conditions of the coreduction are determined by the equilibrium of this reaction:

$$(Cu_2O)_{slag} + 3(FeO)_{slag} \Leftrightarrow 2(Cu)_{metal} + (Fe_3O_4)_{slag}$$

The copper concentration in the molten slag is 2-10%, and the magnetite concentration is 10-20%, depending on the melting process and the matte quality that is produced.

The first step of the slag treatment in the AC arc furnace 1 is concentrated on the magnetite reduction to a value of 7-8% and a copper concentration of 0.8-1.2%, which requires a unit power consumption of 50-70 kWh/t, depending on the original slag composition. The specified degree of slag reduction allows the reduction time to be shortened by about 50%, which corresponds to a twofold increase in the furnace treatment capacities. The slag is tapped continuously or at regular intervals and fed to the second furnace, i.e., the channel-type DC reduction furnace 2 (direct-current furnace).

The coke bed 4 on the surface of the slag, by which the graphite electrode 6 makes contact with the direct-current source 12, acts as the anode, and the liquid matte 5 in contact with the graphite electrode 7 acts as a cathode in the channel-type DC reduction furnace 2.

On the inlet side in the furnace, two permanent magnetic blocks are mounted in the window of the furnace shell at half the height of the slag layer. The interaction of a nonuniform, horizontal magnetic field with a nonuniform, vertical, constant electric field induces the gradient of the Lorentz force acting on the slag.

The Lorentz force, which acts in every elementary volume of conductive liquid, such as molten slag, in crossed, constant electric and permanent magnetic fields, obviously changes the relative density of the liquid:

$$\gamma_A = \gamma \pm j \times B$$

where:
$\gamma_A$=apparent relative density in Nm$^{-3}$,
$\gamma$=relative density in Nm$^{-3}$,
j=current density in a liquid in Am$^{-2}$,
B=magnetic induction in T.

With the aforementioned force, at a current density of 200 to 2,000 A/m$^2$ and a magnetic field strength of 0.005 to 0.1 tesla, the slag velocity is 1 to 2 powers of ten greater than the natural convective velocities. It produces intensive rotation of the slag in the region of the magnet, so that the transfer of magnetite to the surface of the coke is improved, and the reduction is accelerated. At the high temperature of the slag reduction (1,200 to 1,300° C.), the reactions involved in the reduction of the magnetite and the coreduction of the cuprous oxide are controlled by oxygen transfer. The stirring of the slag significantly increases the reduction velocity.

Furthermore, the stirring of the slag prevents the formation of stagnating liquid and homogenizes the slag. Stirring the slag in the first step of the process for removing inclusions is advantageous, because this increases the probability of their collision and coalescence.

The movement of the slag increases the probability of the collision of matte inclusions and metallic copper, so that their coalescence and sedimentation are improved. The second part of the channel-type furnace 2 does not experience intensive slag movement and allows smooth sedimentation of the inclusions.

Due to the ionic structure of the molten slag, the direct current stimulates the slag electrolysis. Cathodic reduction and anodic oxidation result in magnetite reduction, copper separation and the formation of carbon monoxide on the electrodes according to the reactions:

Cathode: $Fe^{3+} + e = Fe^{2+}$ $Cu^+ + e = Cu^0$

Anode: $SiO_4^{4-} + 2C = SiO_2 + 2[CO] + 4e$ $O^{2-} + C = [CO] + 2e$

The cathodic decomposition of magnetite and the separation of copper increase the total rate of the magnetite reduction and removal of copper. The separation of CO as an anodic product forms additional centers of magnetite reduction.

The additional force acting on metallic inclusions as a result of the apparent change in the relative density of the slag and the interaction of the current in the metal and the magnetic field are the same:

$$F_{EMB} = 2 \times \pi \times j \times B \times r^3$$

where:
$F_{EBF}$=buoyancy force in N,
j=current density in A/m$^2$,
B=inductance, magnetic field in T,
r=radius of the inclusion in m.

The interaction of the electric field with the electric surface charge on the surface of the inclusion allows the metal drop to migrate along the electric field lines; the migration velocity, known as the phenomenon of electrocapillary motion, is described by Levich's formula:

$$v_{EM} = \frac{\varepsilon E r}{2\eta_s \left(1 + \frac{r}{2\kappa w}\right)}$$

where:
$v_{EM}$=migration velocity in m·s$^{-1}$,
$\varepsilon$=surface charge in coul m$^{-2}$,
E=intensity of the electric field in V·m$^{-1}$,
$\eta_s$=slag viscosity in Pa·s,
$\kappa$=specific conductivity of the slag in $\Omega^-$m$^{-1}$,
w=resistance of the metal/slag interface in $\Omega$·m$^2$.

Based on the electric charge density, the migration velocity of the metal or the matte inclusions decreases with drop radius according to the formula above. With relatively small inclusions, the migration velocity is significantly higher than the rate of settling by gravity.

The slag treatment in crossed electric and magnetic fields utilizes a series of phenomena, by which the slag purification process becomes very intensive and effective. Electromagnetic stirring of the slag increases the mass transfer, which accelerates the slag reduction and promotes coalescence of the inclusions. Simultaneous slag electrolysis acts as an additional reducing agent with cathodic reduction of magnetite and copper oxide and anodic formation of carbon monoxide. Electrocapillary migration of the inclusions promotes their coalescence and leads to the removal of inclusions from the slag.

EXAMPLE

Slag from the smelting of concentrate in a flash smelter contains 4% Cu and 15% Fe$_3$O$_4$. The slag is tapped every 3 hours and fed through a launder to the 9.5 MVA AC electric arc furnace 1. The amount of slag production is 30 t/h, which corresponds to the processing of 90 t per cycle. The coke consumption amounts to about 8 kg/t, and the power consumption amounts to about 70 kWh/t, which corresponds to an average power consumption of 6.3 MW. After an hour, the slag tapping in the arc furnace is begun and continues for a period of 2 hours. The slag, which has a Cu concentration of 1.1% and an Fe$_3$O$_4$ concentration of 7%, is conveyed through the launder 8 to the DC arc furnace 2 with a chamber that is 4 m long and 1 m wide. The channel-type reduction furnace for semicontinuous slag purification is shown in FIG. 2. The slag flows continuously for 2 hours through the channel-type reduction furnace 2. At a slag level of 1 m, the mean residence time is approximately 30 minutes. At furnace heat losses of 1 GJ/h, the unit power consumption is approximately 35 kWh/t, and the required power consumption 1 MW. At an estimated voltage of 100 V, the current intensity is on the order of 10 kA. The estimated coke consumption is about 2 kg/t. The final slag contains 0.5% Cu and 4% magnetite. The total power consumption amounts to 105 kWh/t, and the coke consumption amounts to 10 kg/t.

This specific embodiment of the method of the invention is thus carried out as a two-step copper slag purification in arc furnaces.

The slag can be charged to the first arc furnace 1 periodically or continuously. In this furnace 1, the graphite or carbon electrodes are inserted into the molten slag, and electric current is supplied through them. Coke or another reducing agent is fed onto the surface of the slag. The slag temperature in the slag purification furnace is controlled by controlling the power consumption. Finally, the extracted metals are tapped in the form of copper matte and metallic copper.

The slag can also be periodically or continuously tapped in the channel-type DC furnace 2. A direct current can be applied between the coke layer on the surface of the slag, which acts as the anode, and the liquid matte at the bottom, which acts as the cathode. The superposed, locally limited magnetic field, which is induced by electromagnets or permanent magnets, is used to set the slag in motion. Coke is charged onto the surface of the slag to maintain the layer of coke at a constant thickness and to maintain favorable electrical contact conditions with the graphite or carbon electrodes. Here, too, the purified final slag can be continuously or periodically tapped. Likewise, the copper matte or the copper matte together with metallic copper can be periodically tapped. In addition, a layer of copper matte (copper) is maintained at the bottom of the furnace as a liquid cathode, which is in contact with a graphite electrode. The electrodes can also consist of a different electrically conductive material.

The copper slag can be the slag that is obtained by the smelting of copper concentrates to copper matte or directly to blister copper or it can be the slag that is obtained by the conversion of copper matte.

A conventional AC electric arc furnace or a DC arc furnace can be used as the first arc furnace 1.

The magnetic field induced by permanent magnets or electromagnets preferably has a magnetic induction in the range of 50 to 1,000 gauss. The permanent magnetic field covers part of the cross section of the molten slag in the region of the electrode or electrodes that are in contact with the coke bed.

The electrodes are preferably made of graphite or carbon. The location of the electrodes allows the flow lines to cross the magnetic field lines. The optimum positioning of the electrodes results in the flow lines running perpendicularly to the magnetic field lines.

As was explained earlier, the layer of molten metal or matte beneath the slag is in contact with a graphite electrode or other type of electrode that serves as the cathode; the carbon or coke layer on the surface of the slag is in contact with a graphite electrode or other type of electrode that serves as the anode.

The intensity of the direct current is preferably in the range of 500 to 50,000 A, depending on the size of the slag purification installation, the amount of slag and the temperature.

Although the proposed method is preferably used for the extraction of copper, it can also be used for other metals, such as lead (Pb), zinc (Zn), platinum (Pt), chromium (Cr), or nickel (Ni).

As a result of the two-step slag reduction and the removal of the copper in two arc furnaces, the first, alternating-current arc furnace can be used for preliminary reduction of the slag and the separation of copper matte, followed by an intensive slag reduction and the removal of inclusions in a channel-type DC reduction furnace with electromagnetic stirring. The use of electromagnetic stirring, which improves mass transfer to the reduction surface and the coalescence of the inclusions, together with slag electrolysis and electrokinetic phenomena, allows efficient slag purification and a high level of recovery of copper. Generally speaking, the proposed method can thus also be used for the reduction of metal oxides. Oxidic smelting of concentrates can also be carried out in the primary smelting unit.

List of Reference Numbers 1 primary or secondary smelting unit (alternating-current furnace)
2 second furnace (direct-current furnace)
3 electromagnet
4 electrode (anode)
5 electrode (cathode)
6 electrical connection (graphite electrode)
7 electrical connection (graphite electrode)
8 connecting channel
9 electrode
10 electrode
11 alternating-current source
12 direct-current source
13 electric coil
14 electric coil
15 slag
16 slag inlet
17 slag outlet

The invention claimed is:

1. A method for the continuous or discontinuous extraction of a metal or several metals from a slag that contains the metal or a compound of the metal, in which the liquefied metal-containing slag is heated in a primary or secondary smelting unit (1) designed as an alternating-current electric furnace, and molten material is then fed from the primary or secondary smelting unit (1) into a furnace (2) designed as a direct-current electric furnace, in which the metal to be extracted is subjected to an electrolytic separation, where a reducing agent in the form of calcium silicide (CaSi), calcium carbide (CaC$_2$), ferrosilicon (FeSi), aluminum (Al), and/or reducing gases is added and/or injected into the primary or secondary smelting unit (1) wherein, in the second furnace (2), which is designed as a direct-current electric furnace, the molten bath is electromagnetically stirred during the recovery of the metal.

2. A method in accordance with claim 1, wherein an arc furnace is used as the primary or secondary smelting unit (1).

3. A method in accordance with claim 1, wherein the metal to be extracted is copper (Cu) present in a copper-containing slag.

4. A method in accordance with claim 1, wherein the metal to be extracted is lead (Pb), zinc (Zn), platinum (Pt), chromium (Cr), or nickel (Ni) present in a slag.

5. A method in accordance with claim 1, wherein a preliminary reduction of the slag and a separation of matte or a metal alloy are carried out in the primary or secondary smelting unit (1), which is designed as an alternating-current electric furnace, and that intensive slag reduction and removal of inclusions are carried out in the second furnace (2), which is designed as a direct-current electric furnace.

6. A method in accordance with claim 1, wherein, to produce the electromagnetic stirring, at least one electromagnet (3) acts on the molten bath present in the second furnace (2).

7. A method in accordance with claim 6, wherein the one or more magnets induce a magnetic field of 50 to 1,000 gauss and that the magnetic field covers at least part of the cross section of the molten bath and a region of the electrodes (4, 5) in the second furnace (2).

8. A method in accordance with claim 1, wherein, to produce the electromagnetic stirring, at least one permanent magnet acts on the molten bath present in the second furnace (2).

9. A method in accordance with claim 1, wherein coke is fed into the primary or secondary smelting unit (1) during the heating as an additional reducing agent.

10. A method in accordance with claim 1, wherein carbon-containing material is fed onto the surface of the molten material in the second furnace (2) in such a way that a layer of the carbon-containing material of essentially constant thickness forms, and the layer, which acts as an anode (4), is in contact with an electrical connection (6).

11. A method in accordance with claim 1, wherein a layer of matte of essentially constant thickness is maintained in the bottom region below the molten bath in the second furnace (2), and the layer, which acts as a cathode (5), is in contact with an electrical connection (7).

* * * * *